United States Patent
Krishnan et al.

(10) Patent No.: US 12,321,977 B2
(45) Date of Patent: Jun. 3, 2025

(54) METHOD AND APPARATUS FOR ONE-TAP MOBILE CHECK-IN

(71) Applicant: Walmart Apollo, LLC, Bentonville, AR (US)

(72) Inventors: Vidyanand Krishnan, Sunnyvale, CA (US); Shalina Stillman, Pacifica, CA (US); Alyssa Thomas, San Francisco, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 235 days.

(21) Appl. No.: 15/883,618

(22) Filed: Jan. 30, 2018

(65) Prior Publication Data

US 2019/0236685 A1    Aug. 1, 2019

(51) Int. Cl.
*G06Q 30/0601* (2023.01)

(52) U.S. Cl.
CPC ................. *G06Q 30/0635* (2013.01)

(58) Field of Classification Search
CPC .................................. G06Q 30/0635
USPC ................................ 705/26, 26.81
See application file for complete search history.

(56) References Cited

U.S. PATENT DOCUMENTS

| | | | |
|---|---|---|---|
| 8,645,222 B1* | 2/2014 | Tamassia | G06Q 20/12 705/72 |
| 8,812,029 B1* | 8/2014 | Cao | H04W 4/21 455/456.3 |
| 9,842,120 B1* | 12/2017 | Siris | H04W 4/029 |
| 2011/0022405 A1* | 1/2011 | Heinz | G06Q 10/02 705/1.1 |
| 2012/0209752 A1* | 8/2012 | Rollinson-Smith | G06Q 10/06 705/30 |
| 2013/0090958 A1* | 4/2013 | Chin | G06Q 30/02 705/5 |
| 2013/0226651 A1* | 8/2013 | Napper | G06Q 30/06 705/7.26 |
| 2014/0207499 A1* | 7/2014 | Fliess | G06Q 10/02 705/5 |

(Continued)

FOREIGN PATENT DOCUMENTS

| | | | | |
|---|---|---|---|---|
| WO | WO-2018128755 A1 * | 7/2018 | | G06F 21/34 |
| WO | WO-2018156677 A1 * | 8/2018 | | G06Q 10/083 |

OTHER PUBLICATIONS

Samuely, Alex, "Sam's Club pilots mobile check-in as it revamps Club Pickup", 2015, Retail Dive (Year: 2015).*

Primary Examiner — Marissa Thein
Assistant Examiner — Thomas Joseph Sullivan
(74) Attorney, Agent, or Firm — Morgan, Lewis & Bockius LLP; Manita Rawat

(57) ABSTRACT

A purchasing system is provided and generally includes a server (e.g., application server), an associate computing device, and a customer computing device. The server can generate an order check-in request associated with a purchase order. The server can add a link to the order check-in request such that activation of the link directly provides an order check-in response to be transmitted to the server indicating that check-in is to be initiated. The server can transmit the check-in request to a remote terminal. The server can receive an order check-in response from the remote terminal in response to transmitting the check-in request, and can initiate check-in for the purchase order in response to receiving the order check-in response.

16 Claims, 7 Drawing Sheets

(56) References Cited

U.S. PATENT DOCUMENTS

| | | | |
|---|---|---|---|
| 2015/0111187 A1* | 4/2015 | Loeb, Jr. | G06Q 10/1095 |
| | | | 434/236 |
| 2015/0120342 A1* | 4/2015 | Dragon | G06Q 10/02 |
| | | | 705/5 |
| 2015/0186831 A1* | 7/2015 | Hulbert | G06Q 10/063114 |
| | | | 705/7.15 |
| 2015/0227882 A1* | 8/2015 | Bhatt | G06Q 10/083 |
| | | | 705/330 |
| 2015/0242764 A1* | 8/2015 | Subbaraj | G06Q 10/02 |
| | | | 705/5 |
| 2015/0254726 A1* | 9/2015 | Cassidy | G06Q 50/12 |
| | | | 705/14.58 |
| 2015/0356664 A1* | 12/2015 | Mackler | G06Q 30/0635 |
| | | | 705/26.81 |
| 2015/0379650 A1* | 12/2015 | Theobald | H04W 40/244 |
| | | | 705/15 |
| 2016/0125508 A1* | 5/2016 | Carr | G06Q 30/0635 |
| | | | 705/26.7 |
| 2016/0147413 A1* | 5/2016 | Kao | H04W 4/029 |
| | | | 715/753 |
| 2016/0247113 A1* | 8/2016 | Rademaker | G06Q 10/083 |
| 2018/0121992 A1* | 5/2018 | Agarwal | H04W 4/029 |
| 2018/0121993 A1* | 5/2018 | Agarwal | G06Q 30/0635 |
| 2019/0228463 A1* | 7/2019 | Chan | G06Q 30/0641 |
| 2021/0065107 A1* | 3/2021 | Jajula | G06Q 10/087 |

* cited by examiner

METHOD AND APPARATUS FOR ONE-TAP MOBILE CHECK-IN

TECHNICAL FIELD

The disclosure relates generally to e-commerce and, more specifically, to the scheduling of purchase orders in e-commerce.

BACKGROUND

At least some online retailers allow customers to place purchase orders remotely through a purchasing system. For example, some retailers use at least some known purchasing systems that allow customers to place purchase orders through the retailer's website. As another example, some retailers allow customers to place purchase orders through an application ("App") executing on a mobile device, such as a cellular phone. Often times, the purchasing system provides an option to the customer to have the purchased items delivered to an address, such as to the customer's home address. Some purchasing systems provide an option to allow the customer to pick up the purchased goods at a store location. For example, the customer can select a store location when making the purchase, and have the retailer gather the goods and have them ready for customer pickup. Some purchasing systems allow the customer to check-in ahead of time to let the retailer know the customer is on their way to pick up the purchased goods at a store location. For example, a retailer's App may allow a customer to check-in by proceeding through a variety of steps to identify the customer, the order, and the time of arrival. These check-in methods, however, have drawbacks. For example, the check-in methods can be burdensome by requiring many steps before a customer is able to check-in as to a particular order.

SUMMARY

The embodiments described herein enable customers to check-in efficiently by providing a one-tap (e.g., touch) check-in process. The customers, for example, do not have to first open up an application on their device to initiate the check-in procedure. Instead, upon receiving a check-in request, customers merely tap once a link provided in the check-in request to initiate the check-in process. Because the embodiments can provide an easier way for customers to check-in, the features of the embodiments can encourage more customers to check-in.

For example, in some embodiments, a purchasing system is provided and includes a server (e.g., application server), an associate computing device, and a customer computing device. The server can generate an order check-in request associated with a purchase order. The server can add a link to the order check-in request such that activation of the link directly provides an order check-in response to be transmitted to the server indicating that check-in is to be initiated. The server can transmit the check-in request to a remote terminal. The server can receive an order check-in response from the remote terminal in response to transmitting the check-in request, and can initiate check-in for the purchase order in response to receiving the order check-in response.

In other embodiments, the customer computing device can enable location services. The server can track a location of the customer computing device based on the enabled location services, and determine an estimated time of arrival based on the tracked location of the customer computing device. The server can queue the purchase order based on the estimated time of arrival. The server can then transmit the indication that the purchase order is ready for pickup to the associate computing device. The server can transmit the indication to the associate computing device a threshold amount of time before the estimated time of arrival.

In yet other embodiments, a method for checking in a purchase order includes generating an order check-in request associated with a purchase order. The method can also include adding a link to the order check-in request such that activation of the link directly provides an order check-in response to be transmitted to a server indicating that check-in is to be initiated. The method can also include transmitting the check-in request to a remote terminal. The method can also include receiving an order check in response from the remote terminal in response to transmitting the check-in request, and initiating check-in for the purchase order in response to receiving the order check-in response.

In other embodiments, a method includes tracking a location of a customer computing device based on enabled location services. The method can include determining an estimated time of arrival based on the tracked location of the customer computing device. The method can also include queuing a purchase order based on the estimated time of arrival. The method can further include transmitting an indication that the purchase order is ready for pickup to an associate computing device. The indication can be transmitted a threshold amount of time before the estimated time of arrival.

In some examples a non-transitory, computer-readable storage medium includes executable instructions that, when executed by one or more processors, cause the one or more processors to generate an order check-in request associated with a purchase order. The executable instructions, when executed by the one or more processors, can also cause the one or more processors to add a link to the order check-in request such that activation of the link directly provides an order check-in response to be transmitted to a server indicating that check-in is to be initiated. The executable instructions, when executed by the one or more processors, can also cause the one or more processors to transmit the check-in request to a remote terminal. The executable instructions, when executed by the one or more processors, can also cause the one or more processors to receive an order check-in response from the remote terminal in response to transmitting the check-in request, and initiate check-in for the purchase order in response to receiving the order check-in response.

In some examples a non-transitory, computer-readable storage medium includes executable instructions that, when executed by one or more processors, cause the one or more processors to track a location of a customer computing device based on location services enabled on the customer computing device. The executable instructions, when executed by the one or more processors, can also cause the one or more processors to determine an estimated time of arrival based on the tracked location of the customer computing device, and queue a purchase order based on the estimated time of arrival. The executable instructions, when executed by the one or more processors, can also cause the one or more processors to transmit an indication that the purchase order is ready for pickup to an associate computing device, for example, a threshold amount of time before the estimated time of arrival.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
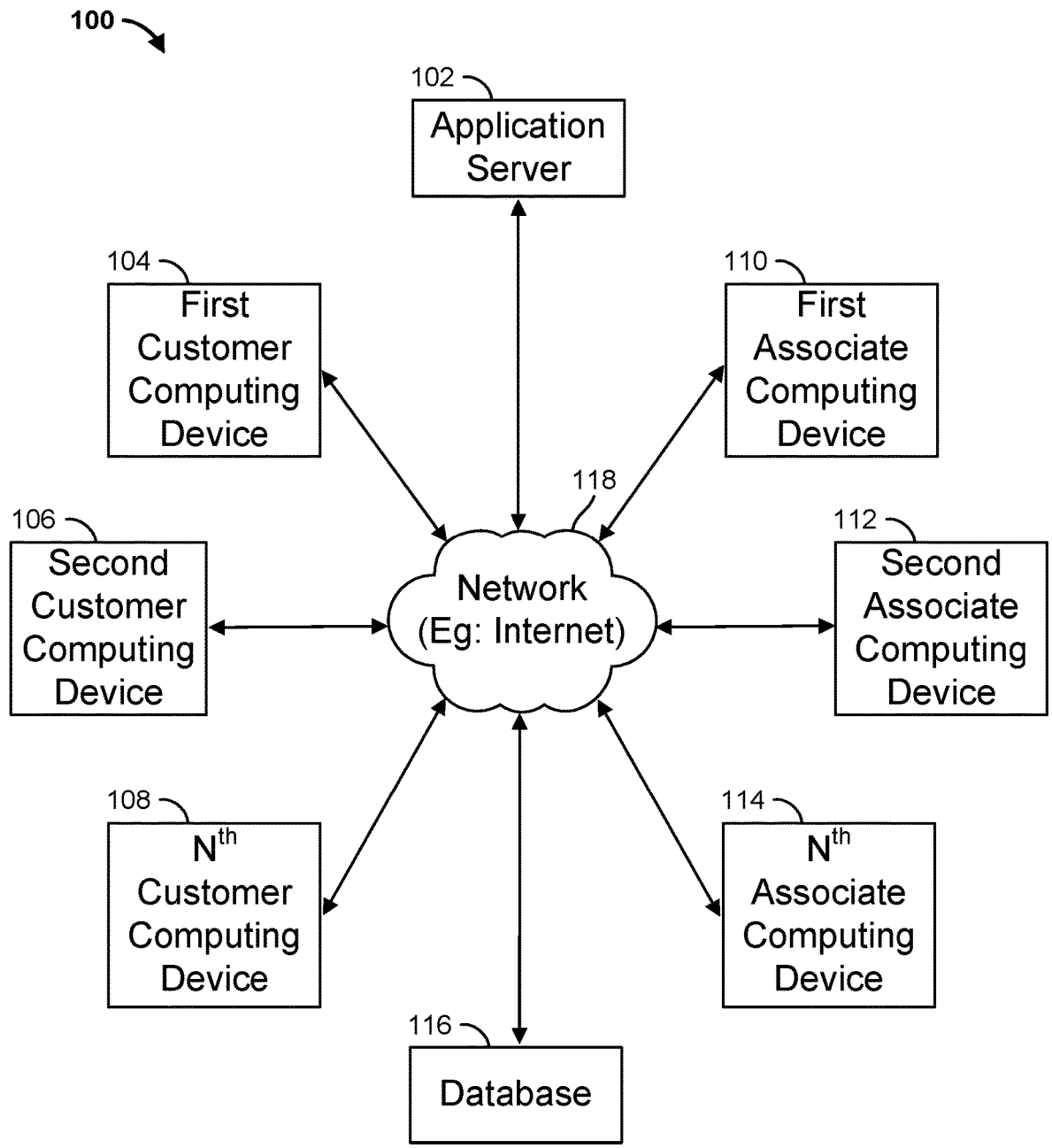
FIG. 1 is a block diagram of a purchasing system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

These preferred embodiments can enable customers to respond to check-in requests easily and efficiently by providing a one-tap check-in process. For example, rather than proceeding through multiple steps, customers can respond to a check-in request by touching or tapping a link provided in a check-in request. The customers, for example, do not have to first open up an application on their device to initiate the check-in procedure.

Turning to the drawings, FIG. 1 illustrates a block diagram of a purchasing system 100 that includes application server 102, multiple customer computing devices (e.g., remote terminals) 104, 106, 108, multiple associate computing devices 110, 112, 114, and database 116, each operably connected to network 118. Application server 102, first customer computing device 104, second customer computing device 106, Nth customer computing device 108, first associate computing device 110, computing device 112, and computing device 114 can each be any suitable computing device that includes any hardware or hardware and software combination for processing and handling information. In addition, each can transmit data to, and receive data from, network 118. For example, each of application server 102, multiple customer computing devices 104, 106, 108, and multiple associate computing devices 110, 112, 114 can be a computer, a workstation, a laptop, a mobile device such as a cellular phone, a cloud-based server, or any other suitable device. Each can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 104, 106, 108, computer system 100 can include any number of customer computing devices 104, 106, 108. Similarly, although FIG. 1 illustrates three associate computing devices 110, 112, 114, computer system 100 can include any number of associate computing devices 110, 112, 114.

Application server 102 can be a server operated by a retailer. Customer computing devices 104, 106, 108 can be computing devices operated by customers of a retailer. Associate computing devices 110, 112, 114 can be computing devices operated by associates (e.g., employees) of the retailer.

Application server 102 is operable to communicate with database 116 over network 118. For example, application server 102 can store data to, and read data from, database 116. Database 116 can be a remote storage device, such as a cloud-based server, a memory device on another application server, a networked computer, or any other suitable remote storage. Although shown remote to application server 102, in some examples database 116 can be a local storage device, such as a hard drive, a non-volatile memory, or a USB stick. For example, database 116 can be a storage device local to application server 102.

Network 118 can be a WiFi® network, a cellular network such as a 3GPP® network, a Bluetooth® network, a satellite network, or any other suitable network. Network 118 can provide access to, for example, the Internet.

Application server 102 can also communicate with first customer computing device 104, second customer computing device 106, and Nth customer computing device 108 over network 118. Similarly, first customer computing device 104, second customer computing device 106, and Nth customer computing device 108 are operable to communicate with application server 102 over network 118. For example, application server 102 can receive data (e.g., messages) from, and transmit data to, first customer computing device 104, second customer computing device 106, and Nth customer computing device 108.

Application server 102 is also operable to communicate with first associate computing device 110, second associate computing device 112, and Nth associate computing device 114. For example, application server 102 can receive data from, and transmit data to, first associate computing device 110, second associate computing device 112, and Nth associate computing device 114.

Purchasing system 100 allows a customer to notify a retailer when the customer is or will be on their way to pick up purchased goods. For example, a customer can place an order with a retailer for the purchase of goods (e.g., groceries). Based on the purchase order, the application server 102 can send a check-in request to a customer computing device 104, 106, 108. The check-in request invites the customer to notify retailer ahead of time that the customer is on their way to pick up the purchased goods, such as at a particular store location. The customer computing device 104, 106, 108 can provide an indication of the received order check-in request to the customer (e.g., a user of the customer computing device).

For example, the order check-in request can be contained in a text message, such as a short message service (SMS) message. The text message can contain a link that activates an application on the customer computing device 104, 106, 108. When the application is activated, the application can cause the customer computing device 104, 106, 108 to transmit, to application server 102 an order check-in response that indicates to the application server 102 that check-in is to be initiated. For example, the order check-in response can indicate to application server 102 that the customer is on their way to pick up the purchased goods.

When the customer is ready to respond, the customer can provide an indication to the customer computing device 104, 106, 108 that check-in is to be initiated (e.g., that the customer is on their way to pick up purchased goods). For example, in continuing the example from above, the customer can select the link contained in the text message (e.g., tap a link shown on a touchscreen of the customer computing device 104, 106, 108 that was provided in an SMS message). In some examples, the customer undergoes no more interactions with the customer computing device 104, 106, 108 to check-in. For example, the customer computing device 104, 106, 108 can detect a single selection of the received order check-in request, and automatically opens an application that initiates the transmission of the order check-in response.

Upon receiving the check-in response, the application server 102 can store the response in database 116, and can transmit a message to an associate computing device 110, 112, 114 indicating that the customer is on their way to pick up the purchased goods.

Customer computing device 104, 106, 108 can include location capabilities that allow for the location of the customer computing device 104, 106, 108 to be determined. For example, customer computing device 104, 106, 108 can include a Global Position System (GPS) device that allows for receiving location data (e.g., latitude and longitude data). As another example, customer computing device 104, 106, 108 can allow for the use of cellular or WiFi® triangulation methods as are recognized in the art. It is to be understood that for any location service to be utilized, the customer may have to consent to the service being used to at least satisfy application privacy rights and/or laws.

Assuming location services are enabled, customer computing device 104, 106, 108 can transmit its location to application server 102 in the check-in response. Application server 102 can then indicate (e.g., display) to the retailer the location of the customer. For example, application server 102 can transmit the location of the customer to associate computing device 110, 112, 114. In some examples, application server 102 determines an estimated time of arrival based on the tracked location of the customer computing device 104, 106, 108.

In some examples, customer computing device 104, 106, 108 determines its location, and transmit the order check-in response to the application server 102 based on the location of the customer computing device. For example, customer computing device 104, 106, 108 can transmit the order check-in response to the application server 102 when it is a threshold distance away from the destination location (e.g., store location where the purchased goods are to be picked up). The threshold distance can be any suitable distance, such as one mile, five miles, or any other distance.

Alternatively, customer computing device 104, 106, 108 can transmit the order check-in response to the application server 102 based on an estimate time until arrival. For example, customer computing device 104, 106, 108 can determine an estimated time until arrival based on its current location and the destination location. Once the estimated time until arrival reaches a threshold, customer computing device 104, 106, 108 transmits the order check-in response to the application server 102. The estimated time until arrival threshold can be any suitable time threshold, such as fifteen minutes, thirty minutes, an hour, or any other suitable time threshold.

In some examples, application server 102 tracks the location of customer computing device 104, 106, 108. For example, customer computing device 104, 106, 108 can transmit its location periodically to application server 102. For example, customer computing device 104, 106, 108 can transmit its location every minute, five minutes, fifteen minutes, or thirty minutes to application server 102. Application server 102 can then track the current location of customer computing device 104, 106, 108, for example, as the customer drives to the store to pick up the purchased goods. Application server 102 can also update an estimated time of arrival for the customer based on received locations that are more recent. For example, the application server 102 can transmit an indication that the customer is ready to pick up the purchased goods to an associate computing device 110, 112, 114 based on the estimated time of arrival. In some examples, the application server 102 transmits the indication that the customer is ready to pick up the purchased goods to an associate computing device 110, 112, 114 a threshold amount of time before the estimated time of arrival. The threshold amount of time can be any suitable amount of time. For example, application server 102 can determine an estimated time of arrival for a customer, and transmit an indication to an associate computing device 110, 112, 114 ten minutes, thirty minutes, or an hour before the determined estimated time of arrival.

In some examples, the application server 102 is configured to queue a purchase order ready for pickup based on the estimated time of arrival. For example, application server 102 can receive multiple check-in responses from multiple customer computing devices 104, 106, 108. For each check-in response, application server 102 can determine an estimated time of arrival, and can place each purchase order associated with each check-in response in a customer queue based on each customer's estimated time of arrival. For example, customers estimated to arrive earlier can appear in the customer queue before customers estimated to arrive later. In some examples, application server 102 can update the customer queue based on updated estimated time of arrivals, as described above.

Figure 2:
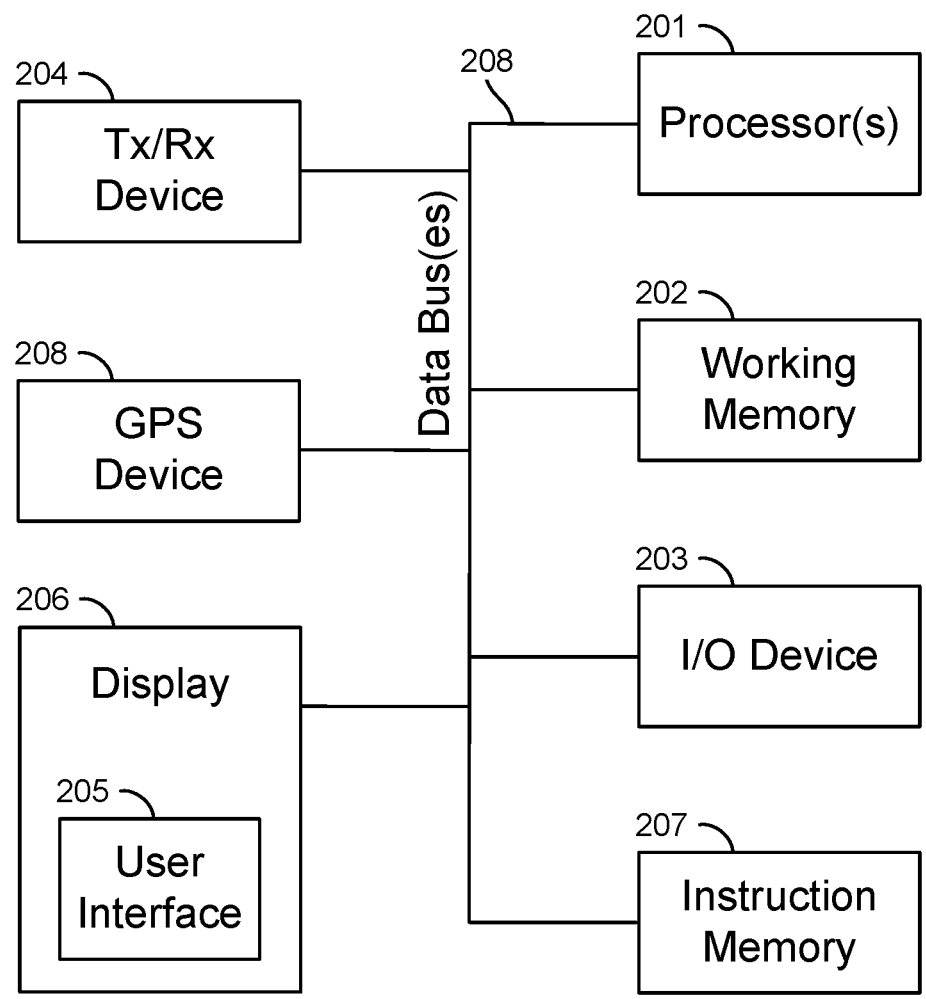
FIG. 2 is a block diagram of a customer computing device of the purchasing system of FIG. 1 in accordance with some embodiments.

FIG. 2 illustrates the first customer computing device 104 of FIG. 1. First customer computing device 104 can include one or more processors 201, working memory 202, one or more input/output devices 203, instruction memory 207, a transceiver 204, a GPS device 208, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 are configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can include read-only memory (ROM) such as electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of first customer computing device 104. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

GPS device 208 can allow for the receiving of location data. For example, GPS device 208 can obtain latitude and longitude information based on the location of first customer computing device 104.

Display 206 can display user interface 205. User interfaces 205 can enable user interaction with first customer computing device 104. For example, user interface 205 can be a user interface for the application that initiates the transmission of the order check-in response described above with respect to FIG. 1. In some examples, a user can interact with user interface 205 by engaging input-output devices 203. In some examples, display 206 includes a touchscreen, and user interface 205 displays SMS messages. For example, user interface 205 can display an SMS message that indicates that an order check-in request has been received. The SMS message can include a link that activates an application that causes the transmission of an order check-in to an application server. The touchscreen can detect when a user taps the link and, in response, can cause the activation of the application.

Transceiver 204 allows for communication with a network, such as the network 118 of FIG. 1. For example, if network 118 of FIG. 1 is a cellular network, transceiver 204 is configured to allow communications with the cellular network. In some examples, transceiver 204 is selected based on the type of network 118 first customer computing device 104 will be operating in. Processors 201 is operable to receive data from, or send data to, a network, such as network 118 of FIG. 1, via transceiver 204.

Figure 3:
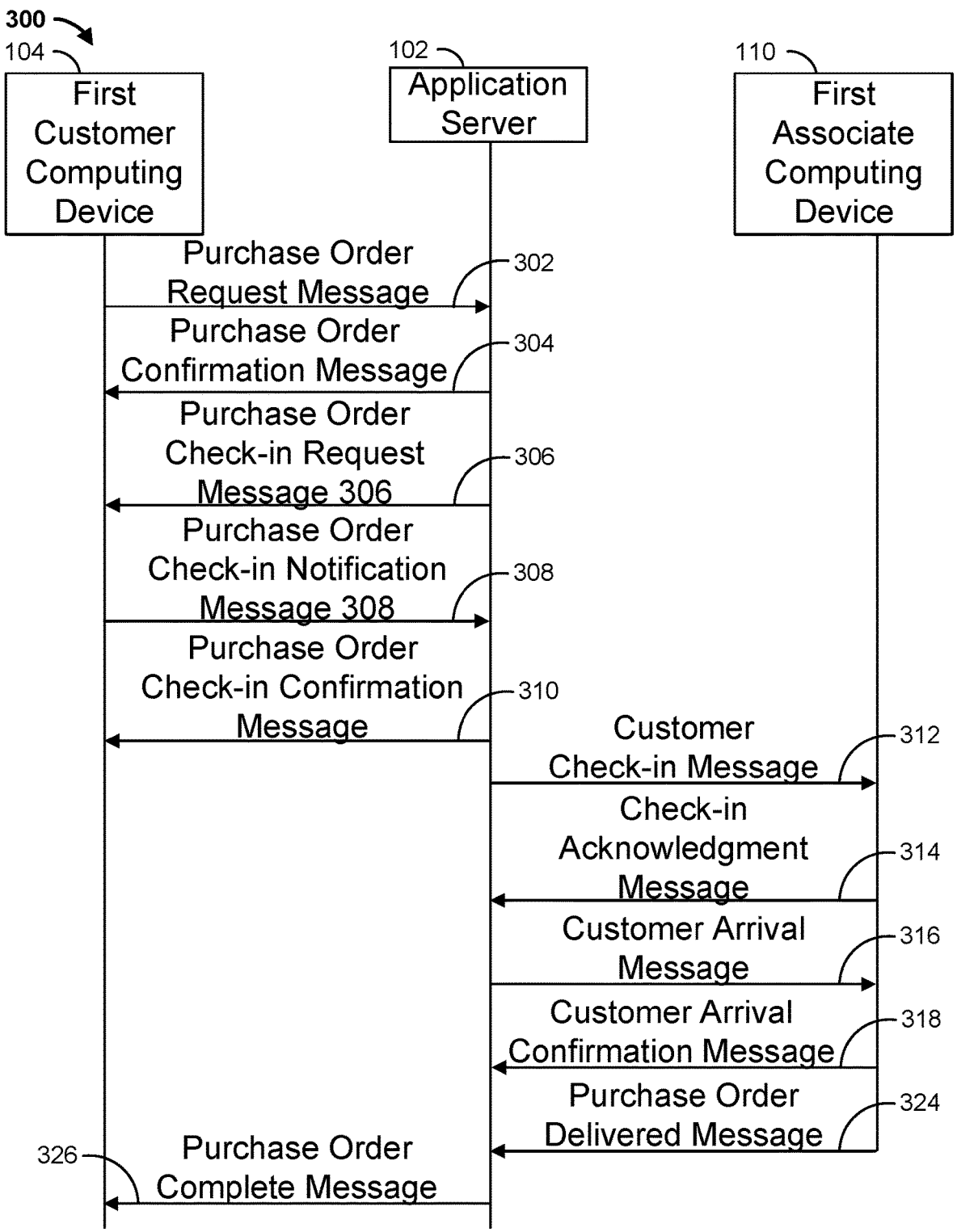
FIG. 3 illustrates a messaging scheme among devices of FIG. 1 in accordance with some embodiments.

FIG. 3 illustrates an example messaging scheme 300 among first customer computing device 104, application server 102, and first associate computing device 110. To begin, first customer computing device 104 transmits a purchase order request message 302 to application server 102. The purchase order request message 302 can include a purchase order for goods, such as groceries. In response, application server 102 transmits purchase order confirmation message 304. Purchase order confirmation message 304 can confirm receipt of purchase order request message 302. For example, purchase order confirmation message 304 can include an order number associated with the purchase order.

Application server 102 then transmits a purchase order check-in request message 306 to first customer computing device 104. For example, application server 102 can transmit the purchase order check-in request message 306 when the purchase order is ready for pickup. The purchase order check-in request message 306 can invite the customer to notify a retailer ahead of time that the customer is on their way to pick up the purchased goods, such as at a particular store location. When the customer is ready to pick up the purchase goods, the customer can cause first customer computing device 104 to transmit purchase order check-in notification message 308 to application server 102. The purchase order check-in notification message can notify the retailer that the customer is on their way to pick up the purchased good associated with the purchase order. In response, application server 102 can transmit a purchase order check-in confirmation message 310 to first customer computing device 104, confirming that purchase order check-in notification message 308 was received.

Application server 102 can transmit a customer check-in message 312 to first associate computing device 110. The check-in message 312 can indicate that the customer is on their way to pick up the purchased goods associated with the purchase order. For example, check-in message 312 can include an indication of the purchase order, such as a purchase order number. In response, first associate computing device 110 can transmit to application server 102 a check-in acknowledgment message 314 confirming receipt of check-in message 312.

When the customer arrives at the store location, application server 102 can transmit a customer arrival message 316 to first associate computing device 110. Customer arrival message 316 can indicate that the customer has arrived to pick up the goods. For example, application server 102 can determine when the customer arrives based on a tracked location of first customer computing device 104. In some examples, application server 102 determines that the customer has arrived when the tracked location indicates a location within a threshold distance from the store location where the customer is picking up the purchased goods. In response, first associate computing device 110 can transmit customer arrival confirmation message 318 to application server 102, confirming receipt of customer arrival message 316.

Once the customer pickups the purchased goods, first associate computing device 110 transmits purchase order delivered message 324 to application server 102. Purchase order delivered message 324 can indicate to application server 102 that the purchased goods have been delivered to (e.g., picked up by) the customer. For example, application server 102 can update a customer queue by removing the purchase order from the customer queue when the purchase order delivered message 324 is received for a corresponding purchase order. Application server 102 can also transmit a purchase order complete message 326 to first customer computing device 104. Purchase order complete message 326 can indicate to first customer computing device 104 that the purchased goods have been picked up and that the purchase order is complete.

Figure 4:
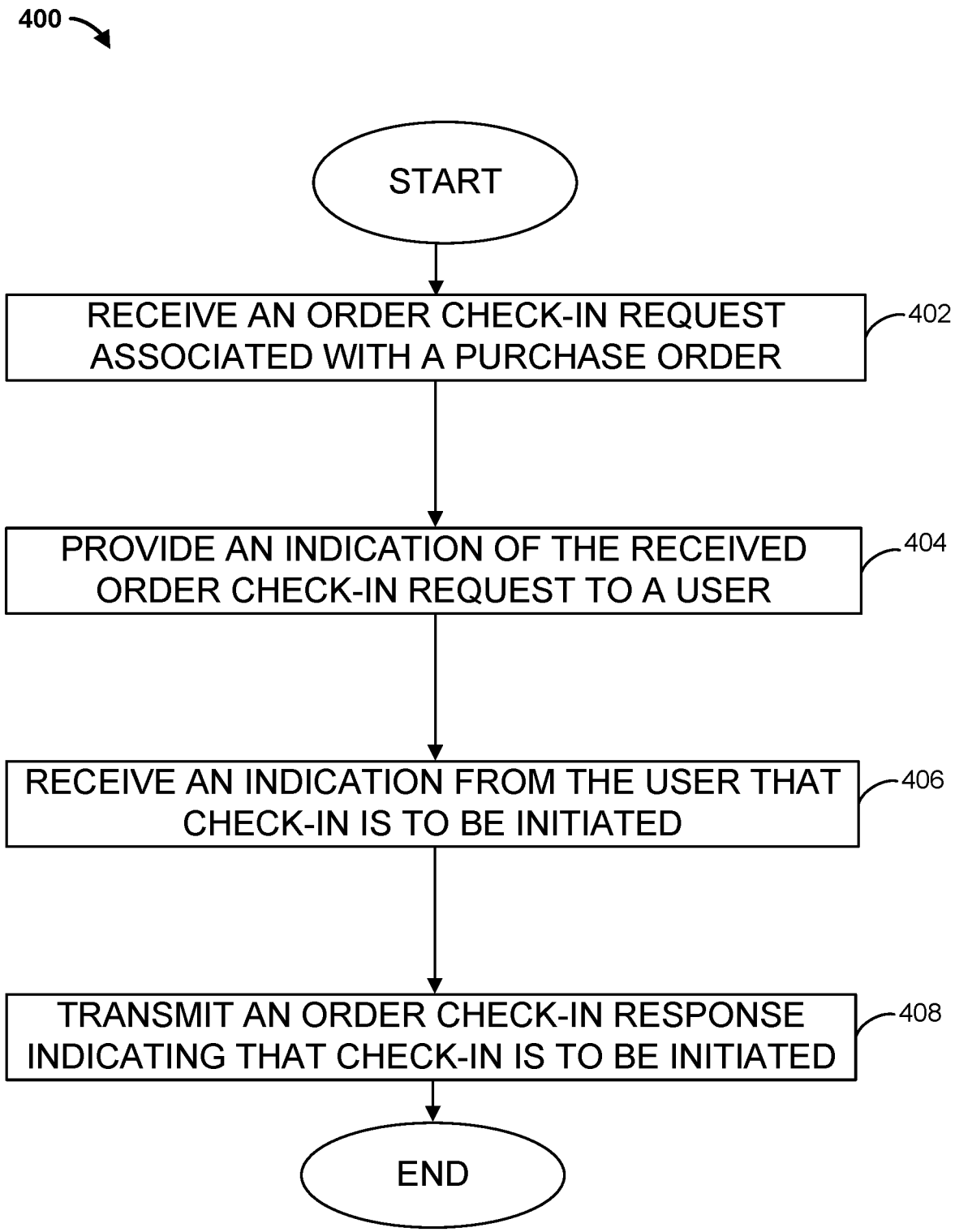
FIG. 4 is a flowchart of an example method that can be carried out by the purchasing system of FIG. 1 in accordance with some embodiments.

FIG. 4 is a flowchart 400 of an example method 402 that can be carried out by customer computing device, such as the first customer computing device 104 of FIG. 1. At step 402, a check-in request associated with a purchase order is received. For example, the purchase order check-in request message 306 from FIG. 3 can be received. At step 404, an indication of the received order check-in request is provided to a user of the first customer computing device. At step 406, an indication from the user is received indicating that check-in is to be initiated. For example, the first customer computing device can display a link received in a purchase order check-in request message. The check-in request can include a link whereby a single selection (e.g., tap) of the link causes an application to automatically open and initiate a transmission of an order check-in response. When the customer is ready to pick up the goods associated with the purchase order, the customer can simply tap the link to initiate check-in. At step 408, a purchase order check-in response is transmitted indicating that check-in is to be initiated. For example, the purchase order check-in response can be the purchase order check-in message 308 of FIG. 3. The purchase order check-in response can indicate that the customer is on their way to pick up the purchased goods.

Figure 7:
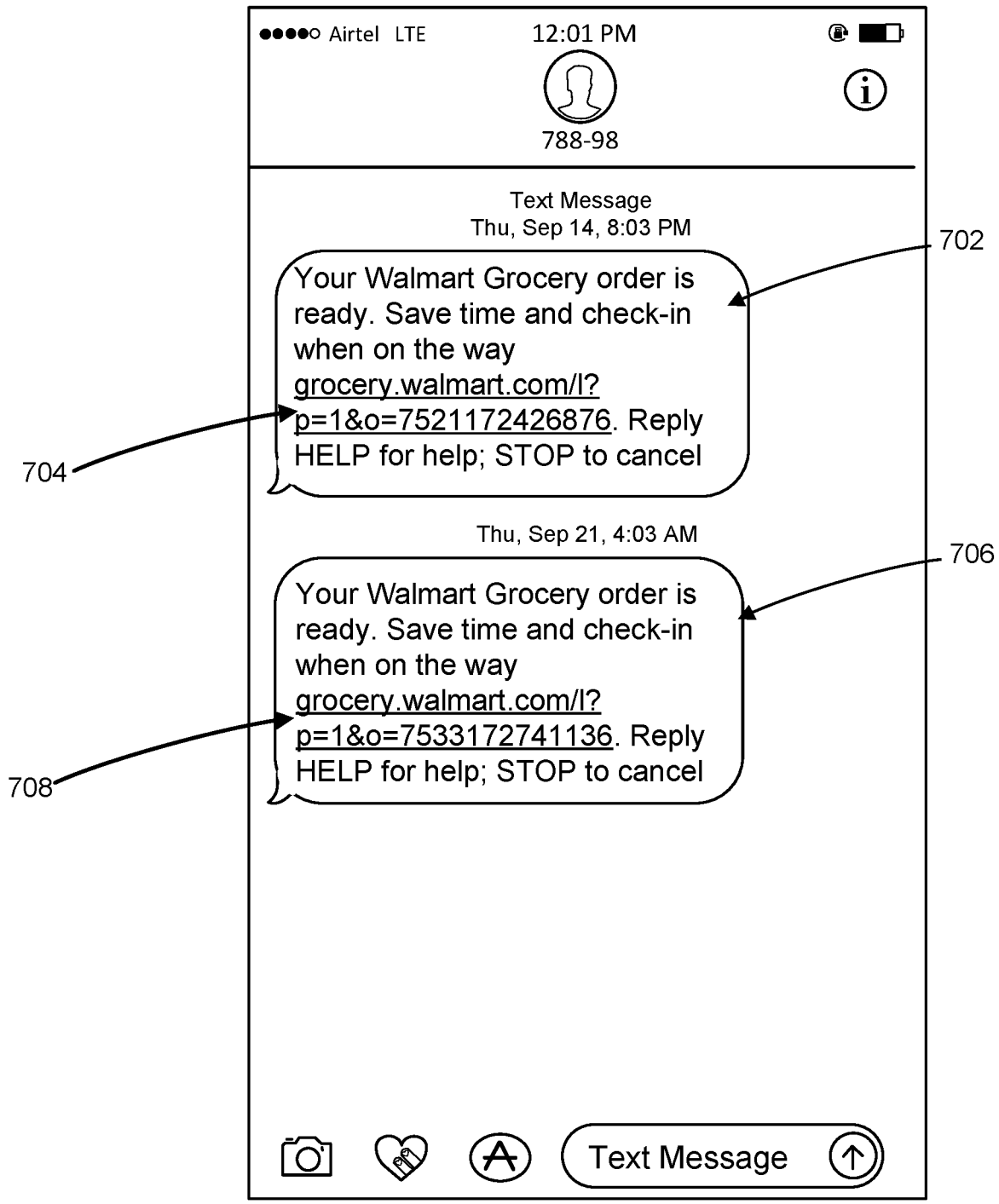
FIG. 7 shows an example purchase order check-in request in the form of an SMS message.

For example, FIG. 7 shows an example customer computing device 700 displaying a purchase order check-in request 702 in the form of an SMS message. Purchase order check-in request 702 includes link 704. In one example, if a user where to select link 704, an application would automatically open on the first customer computing device. The application would, in turn, automatically transmit the purchase order response. These features provide a much more efficient way for a customer to check-in, thereby encouraging customer adoption of the technology. FIG. 7 also shows a second purchase order check in request 706, also in the form of an SMS message. The second purchase order check-in request 706 includes link 708 which, if selected by the user, would also cause the application to automatically open on the first customer computing device thereby causing the purchase order response to be automatically transmitted (e.g., without further customer input). The second purchase order check-in request 706 may be sent, for example, if the customer has not responded (e.g., selected the provided link) to purchase order check-in request 702 within a threshold amount of time (e.g., 15 minutes, 30 minutes, an hour, or any other suitable time period).

Figure 5:
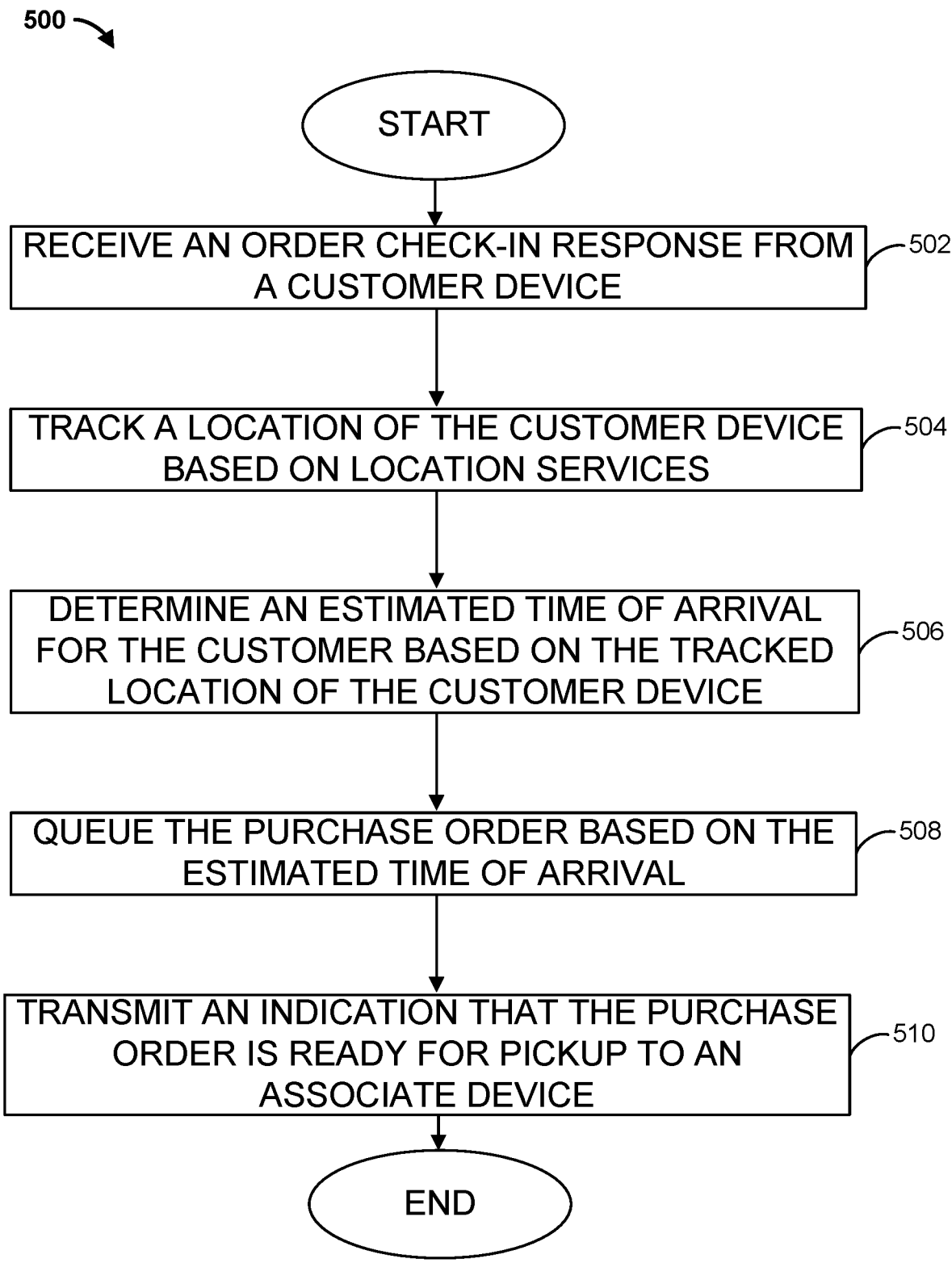
FIG. 5 is a flowchart of another example method that can be carried out by the purchasing system of FIG. 1 in accordance with some embodiments.

FIG. 5 is a flowchart of an example method 500 that can be carried out by an application server, such as the application server 102 of FIG. 1. At step 502, an order check-in response is received from a customer computing device, such as the first customer computing device 104 of FIG. 1. The order check-in response can be the purchase order check-in message 308 of FIG. 3. At step 504, the application server tracks a location of a customer computing device based on location services, such as enabled location services of the customer computing device. At step 506, an estimated time of arrival for the customer is determined based on the tracked location of the customer computing device. For example, the estimated time of arrival can be the estimated amount of time before the customer arrives at a particular location to pick up the goods associated with the purchase order. At step 508, the purchase order is queued based on the estimated time of arrival. For example, purchase orders with shorter estimated time of arrivals can appear before other purchase orders with longer estimated time of arrivals. At step 510, an indication that the purchase order is ready for pickup is transmitted to an associate computing device, such as the first associate computing device 110 of FIG. 1. The indication can be, for example, the customer check-in message 312 of FIG. 3.

Figure 6:
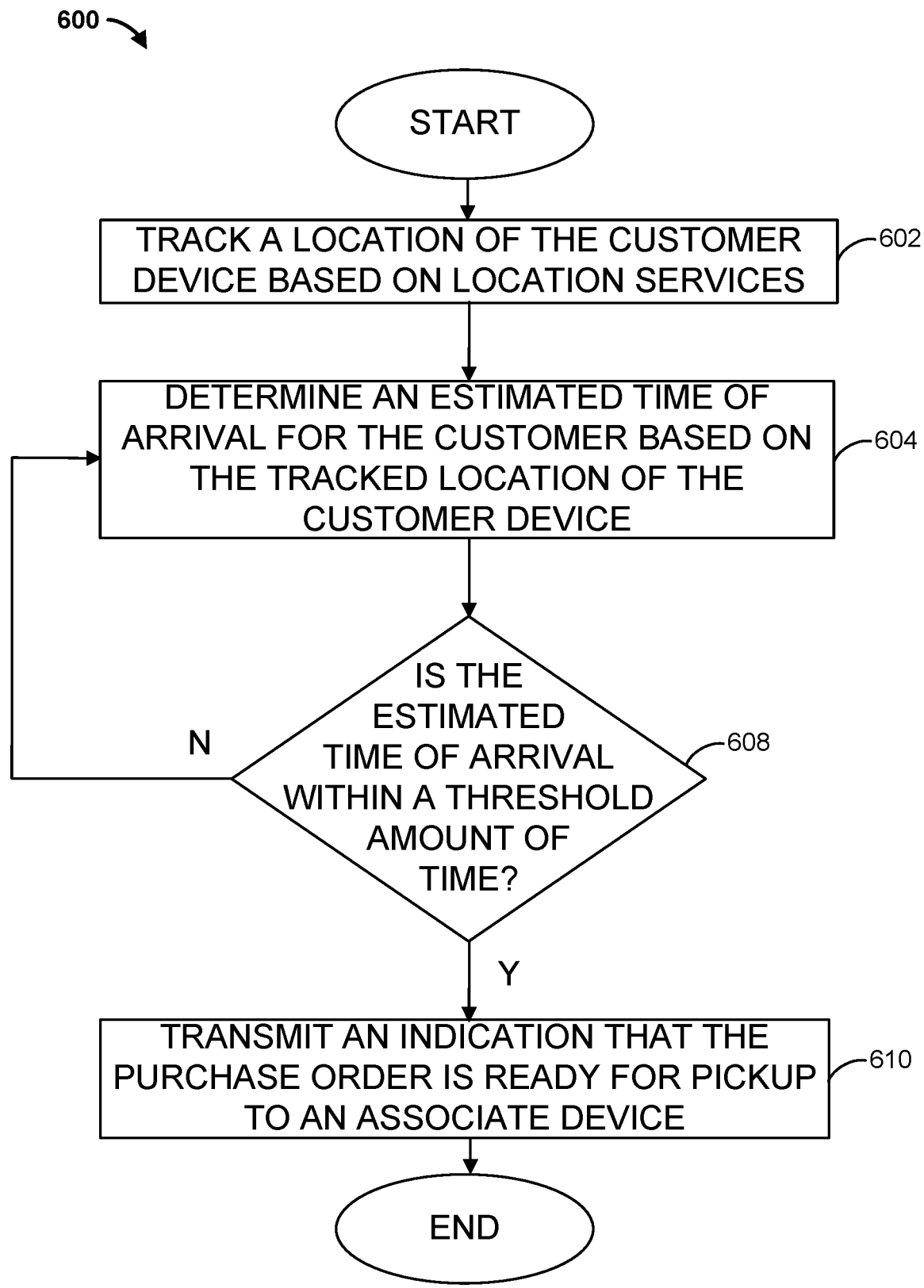
FIG. 6 is a flowchart of yet another example method that can be carried out by the purchasing system of FIG. 1 in accordance with some embodiments.

FIG. 6 is a flowchart of another example method 600 that can be carried out by an application server, such as the application server 102 of FIG. 1. At step 602, a location of a customer computing device is tracked based on location services. At step 604, an estimated time of arrival for the customer is determined based on the tracked location of the customer computing device. At step 610, a determination is made as to whether the estimated time of arrival is within a threshold amount of time. If the estimated time of arrival is not within the threshold amount of time, the method proceeds back to step 608. If, however, the estimated time of arrival is within the threshold amount of time, the method proceeds to step 610. At step 610, an indication that the purchase order is ready for pickup is transmitted to an associate computing device, such as the first associate computing device 110 of FIG. 1.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising: a server communicatively coupled to a database and configured to:
obtain, from a remote terminal of a user operating the remote terminal, a purchase order request including a purchase order of goods purchased by the user;
in response to obtaining, from the remote terminal, the purchase order request, generate an order check-in request for picking up items associated with the obtained purchase order request, along with a link;
in accordance with a determination that the link has been activated, cause execution of an application to transmit an order check-in response from the remote terminal to the server, the order check-in response indicating that check-in is to be initiated, and receive, at the server from the remote terminal, location data, the location data including current location information;

in accordance with a determination that the link has not been activated within a threshold, generate a second order check-in request for picking up the items associated with the obtained purchase order request, along with the link;

transmit the order check-in request along with the link to the remote terminal for activation on the remote terminal, wherein the order check-in request comprises a reference to the purchase order request;

receive the order check-in response from the remote terminal in response to a customer activating the link in the transmitted order check-in request on the remote terminal; and in response to receiving the order check-in response:

store the order check-in response in the database;

generate an order check-in confirmation confirming reception of the order check-in response;

transmit the order check-in confirmation to the remote terminal;

track a current location of the remote terminal based on obtained location data of the remote terminal;

determine an estimated time of arrival of the remote terminal to a first location based at least in part on the tracked current location;

transmit the estimated time of arrival to initiate check-in for the purchase order of the obtained purchase order request at least a threshold amount of time before the estimated time of arrival;

receive a check-in acknowledgement message from a first associate computing device confirming check-in for the purchase order;

transmit an arrival message when the obtained location data of the remote terminal indicates the remote terminal is within a predetermined threshold distance from the first location, wherein the arrival message indicates the remote terminal is at the first location;

receive a customer arrival confirmation message in response to transmission of the arrival message, wherein the customer arrival confirmation message is transmitted by the remote terminal;

receive a delivered message from the first associate computing device, wherein the delivered message indicates the goods purchased by the user have been delivered; and transmit a purchase order complete message to the remote terminal in response to receiving the delivered message;

wherein the server is configured to generate the link such that a single selection of the link causes the application to automatically open, which initiates the transmission of the order check-in response.

2. The system of claim 1, wherein the server is configured to queue the purchase order of the purchase order request based on the estimated time of arrival.

3. The system of claim 2, wherein the server is configured to transmit, to an associate computing device, an indication that the purchase order is ready for pickup, based on the estimated time of arrival.

4. The system of claim 3, wherein the server is configured to transmit, to the associate computing device, the indication that the purchase order is ready for pickup, when the threshold amount of time before the estimated time of arrival is reached.

5. The system of claim 1, wherein the server is configured to generate the link such that activation of the link further causes the remote terminal to:

determine a current location of the remote terminal; and transmit, to the server, the order check-in response based on the current location of the remote terminal.

6. The system of claim 1, wherein the server is configured to transmit the order check-in request in a text message.

7. The system of claim 1, wherein the application automatically opens in response to a single selection of the link, and wherein the application initiates the transmission of the order check-in response and enables location services.

8. The system of claim 1, wherein the server transmits, to the remote terminal, the order check-in request when the purchase order is ready for pickup.

9. A method comprising:

obtaining, from a remote terminal of a user operating the remote terminal, a purchase order request including a purchase order of goods purchased by the user;

in response to obtaining, from the remote terminal, the purchase order request, generating, by a server, an order check-in request for picking up items associated with the obtained purchase order request, along with a link;

in accordance with a determination that the link has been activated, causes execution of an application to transmit an order check-in response from the remote terminal to the server, the order check-in response indicating that check-in is to be initiated, and receive, at the server from the remote terminal, location data, the location data including current location information;

in accordance with a determination that the link has not been activated within a threshold, generate as second order check-in request for picking up the items associated with the obtained purchase order request, along with the link;

transmitting, by the server, the order check-in request along with the link to the remote terminal for activation on the remote terminal, wherein the order check-in request comprises a reference to the purchase order request;

receiving, by the server, the order check-in response from the remote terminal in response to a customer activating the link in the transmitted order check-in request on the remote terminal; and in response to receiving the order check-in response:

storing the order check-in response in a database;

generating, by the server, an order check-in confirmation confirming reception of the order check-in response;

transmitting, by the server, the order check-in confirmation to the remote terminal;

tracking a current location of the remote terminal based on obtained location data of the remote terminal;

determining an estimated time of arrival of the remote terminal to a first location based, at least in part on the tracked current location;

transmitting, by the server, the estimated time of arrival to initiate check-in for the purchase order of the obtained purchase order request at least a threshold amount of time before the estimated time of arrival;

receiving a check-in acknowledgement message from a first associate computing device confirming check-in for the purchase order;

transmitting an arrival message when the obtained location data of the remote terminal indicates the remote terminal is within a predetermined threshold distance from the first location, wherein the arrival message indicates the remote terminal is at the first location;

receiving a customer arrival confirmation message in response to transmission of the arrival message, wherein the customer arrival confirmation message is transmitted by the remote terminal;

receiving a delivered message from the first associate computing device, wherein the delivered message indicates the goods purchased by the user have been delivered; and transmitting a purchase order complete message to the remote terminal in response to receiving the delivered message;

wherein the server is configured to generate the link such that a single selection of the link causes the application to automatically open, which initiates the transmission of the order check-in response.

10. The method of claim 9, further comprising:
queueing the purchase order of the purchase order request based on the estimated time of arrival; and
transmitting, to an associate computing device, an indication that the purchase order is ready for pickup, when the threshold amount of time before the estimated time of arrival is reached.

11. The method of claim 9, comprising:
determining, by the remote terminal, a current location of the remote terminal; and
receiving, by the server, the order check-in response from the remote terminal based on the location of the remote terminal.

12. The method of claim 9, comprising, transmitting the order check- in request in a text message.

13. The method of claim 9, wherein the server transmits, to the remote terminal, the order check-in request when the purchase order is ready for pickup.

14. A non-transitory, computer-readable storage medium comprising executable instructions that, when executed by one or more processors, cause the one or more processors to:
obtain, from a remote terminal of a user operating the remote terminal, a purchase order request including a purchase order of goods purchased by the user;
in response to obtaining, from the remote terminal, the purchase order request, generate a first order check-in request for picking up items associated with the obtained purchase order request, along with a link;
in accordance with a determination that the link has been activated, causes execution of an application to transmit an order check-in response from the remote terminal to the server, the order check-in response indicating that check-in is to be initiated, and receive, at the server from the remote terminal, location data, the location data including current location information;
in accordance with a determination that the link has not been activated within a threshold, generate as second order check-in request for picking up the items associated with the obtained purchase order request, along with the link;
transmit the order check-in request along with the link to the remote terminal for activation on the remote terminal, wherein the order check-in request comprises a reference to the purchase order request;
receive the order check-in response from the remote terminal in response to transmitting the order check-in request on the remote terminal; and
in response to receiving the order check-in response:
store the order check-in response in a database;
generate an order check-in confirmation confirming reception of the order check-in response;
transmit the order check-in confirmation to the remote terminal;
track a current location of the remote terminal based on obtained location data of the remote terminal;
determine an estimated time of arrival of the remote terminal to a first location based at least in part on the tracked current location;
transmit the estimated time of arrival to initiate check-in for the purchase order of the obtained purchase order request at least a threshold amount of time before the estimated time of arrival;
receive a check-in acknowledgement message from a first associate computing device confirming check-in for the purchase order;
transmit an arrival message when the obtained location data of the remote terminal indicates the remote terminal is within a predetermined threshold distance from the first location, wherein the arrival message indicates the remote terminal is at the first location;
receive a customer arrival confirmation message in response to transmission of the arrival message, wherein the customer arrival confirmation message is transmitted by the remote terminal;
receive a delivered message from the first associate computing device, wherein the delivered message indicates the goods purchased by the user have been delivered; and
transmit a purchase order complete message to the remote terminal in response to receiving the delivered message;
wherein the server is configured to generate the link such that a single selection of the link causes the application to automatically open, which initiates the transmission of the order check-in response.

15. The computer-readable storage medium of claim 14, wherein the executable instructions, when executed by the one or more processors, cause the one or more processors to:
determine a current location of the remote terminal; and
receive, by the one or more processors, the order check-in response from the remote terminal based on the location of the remote terminal.

16. The computer-readable storage medium of claim 14, wherein the executable instructions, when executed by the one or more processors, cause the one or more processors to:
queue the purchase order of the purchase order request based on the estimated time of arrival; and
transmit, to an associate computing device, an indication that the purchase order is ready for pickup, when the threshold amount of time before the estimated time of arrival is reached.

* * * * *